April 6, 1937.   O. W. HUNTER   2,076,372
PROCESS FOR IMPROVING THE VISCOSITY OF CERTAIN FATTY LIQUIDS
Filed April 23, 1932
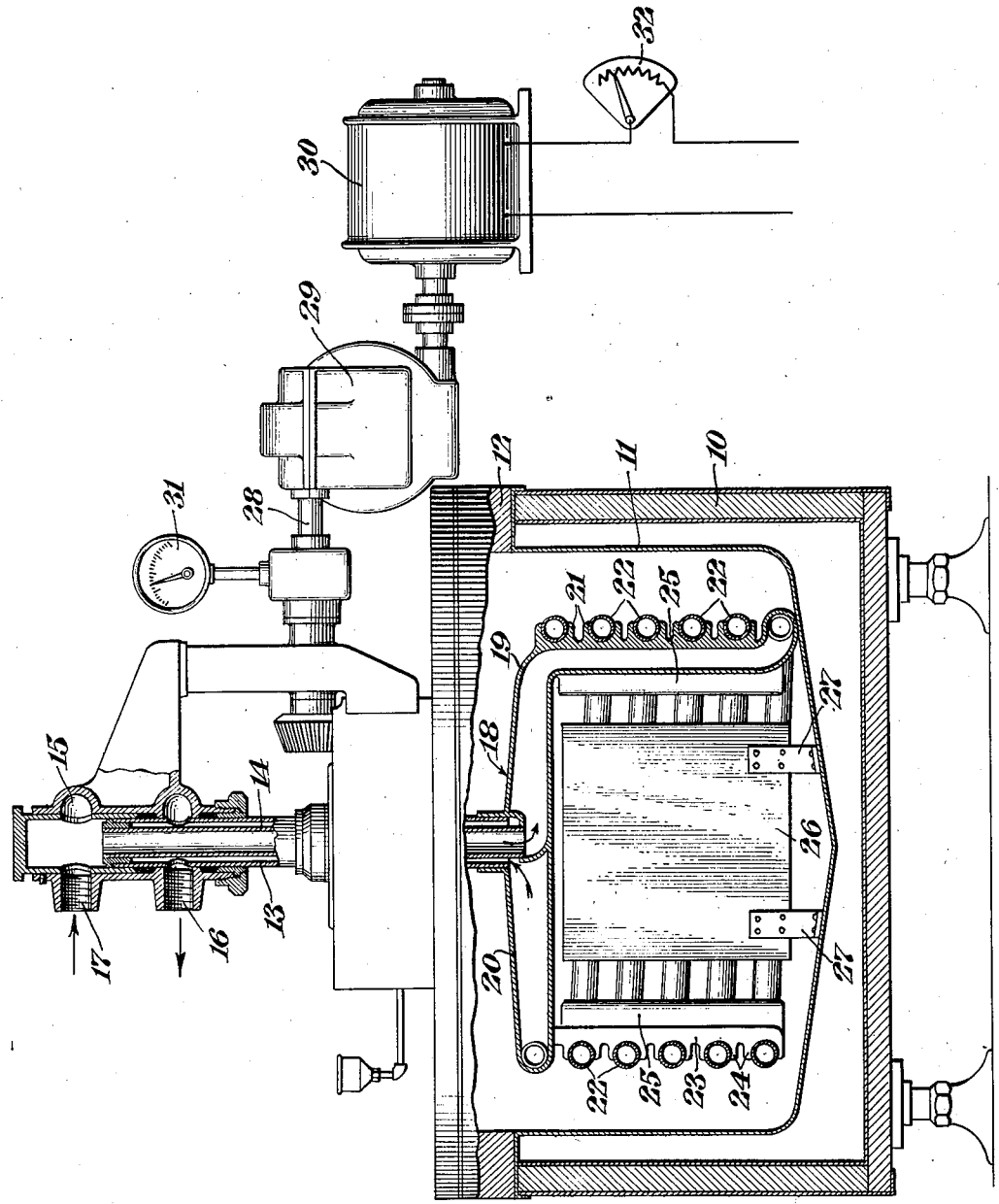
INVENTORS
Oliver W. Hunter
BY Kenyon & Kenyon
ATTORNEYS Patented Apr. 6, 1937

2,076,372

UNITED STATES PATENT OFFICE 2,076,372

PROCESS FOR IMPROVING THE VISCOSITY OF CERTAIN FATTY LIQUIDS

Oliver W. Hunter, Los Angeles, Calif., assignor, by direct and mesne assignments, to Jensen Creamery Machinery Company, Inc., Bloomfield, N. J., a corporation of New York Application April 23, 1932, Serial No. 607,056

14 Claims. (Cl. 99—60)

This invention relates to a process of treating fat-containing liquids, such, for example, as cream, to increase the viscosity thereof.

A relatively high degree of viscosity is a desirable characteristic of cream, particularly pasteurized cream and attempts have heretofore been made to increase the viscosity of cream, but the treating processes used in such attempts have involved the introduction of adulterants or the use of pressures applied mechanically or otherwise, which processes have often resulted in a less stable finished product. These processes, therefore, have not been acceptable because of the adulterated or unfavorably physically altered or unstable characteristics of the ultimate product.

In raw or pasteurized cream, butter fat is unevenly distributed in the milk serum in the form of globules and clusters thereof and the cream is of relatively low viscosity. According to the present invention, the cream is heated to effect sub-division of the fat globules and clusters and more uniform dispersion of the resulting smaller fat globules and clusters throughout the serum, thereby increasing the contact area between the fat and serum as well as increasing the adhesion between the fat globules and serum and rendering the cream more homogeneous. Coalescence of the resulting smaller fat globules and clusters into a more or less honeycomb or fibrous structure diffused throughout the serum is effected and rendered permanent by cooling, thereby increasing the viscosity of the cream. By this treatment, the viscosity of cream may be increased to and maintained at any desired degree.

In practicing the process, raw or pasteurized cream is heated from a temperature at which the butter fat in the cream is congealed or in a state of rest to a definite and controlled temperature determined by the melting point of the butter fat and is held at such temperature, thereby softening the butter fat and effecting sub-division of the fat globules and clusters thereof and increased dispersion of the resulting fat globules and clusters throughout the serum and coalescence thereof in a more or less honeycomb and fibrous structure. The cream is then cooled to congeal the butter fat and preserve the more or less honeycomb arrangement of the fat globules and clusters. Such processing of the cream greatly increases its viscosity and may even result in undesirably high viscosity which may be overcome by agitating the cream either during or after cooling. The temperature to which the cream is heated and the length of time that it is held at the temperature varies with different kinds, percentages and melting points of the butter fat in the cream, but in each instance, there is a definite and limited temperature range within which a pronounced viscosity increase is obtained and above and below which only slight, if any, viscosity increase is obtained. Within limits, the increase in viscosity is dependent upon the length of time that the cream is maintained at the optimum temperature. Temperatures between 75° and 95° F. have been found to be effective in obtaining the viscosity increase, while temperatures below 75° and above 95° have been found to have little, if any, increasing effect on the viscosity of the cream.

It is to be noted that the optimum temperature range is well below pasteurization temperature and that pasteurization does not result in any material viscosity increase. Consequently, the process of increasing the viscosity is a separate and independent treatment and is applicable to both raw and pasteurized cream.

The process of the present invention is not limited to the treatment of cream, but is applicable to the treatment of similar relatively stable fat-inhydrated colloid emulsions in which the solid constituents are permanently dispersed and the fat globules are held in suspension in a serum by the colloidal non-fatty constituents, the serum being the continuous phase in which the fat globules are suspended. Such liquids may be processed in accordance with the present invention to distribute the fat in dispersed condition throughout the serum, thereby increasing the viscosity of the liquid.

Cream may be processed according to the invention with any suitable apparatus and merely by way of illustration, an apparatus well adapted for practicing the process is disclosed in the accompanying drawing, wherein:

Fig. 1 is a vertical section of such apparatus, it being understood that the process is in no way limited to the use of this particular apparatus.

In the apparatus disclosed, 10 is a frame or support within which is contained a vat 11 having a cover 12. A tubular shaft 13 is rotatably supported by the cover 12 and within the tubular shaft 13 is arranged a tube 14. Both the tubular shaft and the tube 14 project into the head of a bracket 15 which is supported by the cover 12. The head 15 is provided with an outlet port 16 communicating with the annular space between the tube 14 and the tubular shaft 13 and with an inlet port 17 communicating with the upper end of the tube 14.

The lower ends of the shaft 13 and tube 14 are threaded into sockets in a casing 18 having radially extending hollow arms 19 and 20 and the arm 19 is provided with a vertical extension, this vertical extension being provided with pairs of lugs 21. The interior of arm 20 communicates with the annular space between the shaft 13 and tube 14 and the interior of the arm 19 communicates with the lower end of the tube 14. A helical coil of pipe 22 is attached at its lower end to the lower end of the extension of the arm 19 and is attached at its upper end to the outer end of the arm 20, the turns of the coil being received within the lugs 21 which serve to space the turns properly and support the coil. Preferably a vertical bar 23 is carried by arm 20 and is provided with lugs 24 which further serve to properly space the turns and support the coil. The vertical portion of the arm 19 and bar 23 are preferably provided with inwardly projecting fins 25 which extend generally in the direction of rotation of the coil.

A vertical baffle plate 26 is supported from the bottom of the vat by straps 27. The bottom edge of this plate is spaced slightly from the bottom of the vat. The baffle plate extends upwardly toward the top of the coil and its side edges are spaced somewhat from the inner wall of the coil.

The drive shaft 28 is connected through reduction gearing 29 with a motor 30. A speed indicator 31 is geared to the shaft 28 and is properly calibrated to indicate the number of revolutions per minute of the coil 22. A rheostat 32 is provided for controlling the current supply to the motor to permit regulation of the rotational speed of the coil.

In using the above described apparatus in the treatment of raw or pasteurized cream, the temperature of the cream in the vat at the start of the treatment is such that the vat is congealed or in a state of rest, such temperature usually being in the range of from 40° to 60° F. Heating fluid is circulated through the coil 22 and the coil is rotated to effect uniform heating of the cream. The coil also acts as an agitator and its speed of rotation is so controlled that the agitation effected by it is not sufficiently violent to churn the cream. The flow of heating fluid at a properly controlled temperature through the coil and the rotation of the coil is continued until the cream has been brought to the desired temperature, this temperature being dependent upon the character of the cream, but lying somewhere in the range of 75° F. to 95° F., the optimum temperature usually being from 80° F. to 90° F., dependent on the melting temperature of the butter fat. Rotation of the coil may be then stopped and the cream maintained at the optimum temperature for a predetermined period of time, usually from one to fifteen minutes, the result being more pronounced with the longer period of time, or cooling of the cream may be started immediately. Cooling fluid is then circulated through the coil 22 which is rotated slowly to cool the cream to the congealing temperature of the fat. After being held at the latter temperature for an hour or more, the viscosity of the cream is much increased over the viscosity thereof prior to processing.

During the heating of the cream up to the optimum temperature, the butter fat is softened and the fat globules and clusters are sub-divided and more uniformly dispersed throughout the serum and while the cream is held at the optimum temperature, the dispersed fat globules and clusters influenced by thermo-circulation and the Brownian movement are coalesced into a more or less honeycomb and fibrous structure. The extent of the development of the honeycomb and fibrous structure is dependent, within limits, upon the length of time that the cream is maintained at the optimum temperature. The honeycomb or sponge-like structure is rendered permanent by cooling to the congealing temperature of the butter fat. Agitation of the cream during the cooling operation preferably is limited as much as possible so as to preserve the honeycomb and fibrous structure, but the cream may be somewhat agitated during the cooling operation to prevent excessive viscosity of the final product. In the event that the viscosity of cream processed according to the invention is undesirably high, the viscosity may be reduced to the desired degree by agitation after cooling.

The herein disclosed apparatus has been successfully used to treat 25% butter fat cream to increase the viscosity thereof. At the start of the treatment, the cream temperature was 45° F. and it was heated to 88° F. by heat derived from hot water passed through the coil. The coil was rotated at 11 R. P. M. during the heating of the cream from 45° F. to 70° F. and at 6 R. P. M. during heating of the cream from 70° F. to 88° F., the initial temperature of the water being 120° which was decreased to 95° as the temperature of the cream approached 88°. After the cream had attained the temperature of 88°, the coil was stopped and the hot water in the coil was replaced with cold water to reduce oiling off of fat next to the coil. After the cream had been held quiescent for five minutes, the coil was again started and ice water passed through it to effect cooling of the cream. For a few revolutions, the coil was run at 11 R. P. M. to mix separated oil into the cream and then was run at 6 R. P. M. until the temperature of the cream dropped to 75°, after which the coil speed was reduced to 3 R. P. M. until the temperature of the cream decreased to 50° when the coil was stopped and the cooling continued without rotation of the coil until a final temperature of 45° was attained. The cream was left in the vat long enough to effect thorough cooling of the fat and was found to be of too high viscosity for bottling. The coil, thereupon, was again rotated to agitate the cream and reduce the viscosity to the degree suitable for bottling.

The arrangement of the speed indicator and the rheostat makes it possible for the operator to control accurately the rotational speed of the coil and consequently the degree of agitation. By properly controlling the rotational speed of the coil, the ultimate viscosity increase may be regulated, as desired.

While the above described apparatus is well adapted for practicing the process of the invention, inasmuch as it is equipped to quickly and uniformly both heat and cool the cream, the process may be practiced with any other equipment suitable to effect the required heating and cooling of the cream regardless of whether or not there is agitation of the cream during treatment. Irrespective of the equipment used, cream heated from the temperature at which the butter fat therein is congealed to a temperature slightly under the melting point of the butter fat and then cooled to the temperature at which the butter fat congeals will experience a pronounced viscosity increase, providing, during cooling, the cream is not subjected to damaging agitation. The cream should not be heated appreciably above the melting temperature of the fat as under such condition it becomes liquid and the advantages of the sub-division of the fat globules and dispersion of the same is lost.

The extent of the ultimate viscosity increase is controllable by agitation of the cream either during cooling or after it has been held at congealing temperature of the fat.

In cream, processed according to this invention, the butter fat is uniformly distributed in highly dispersed condition throughout the milk serum, thus giving to the cream the desirable characteristic of high viscosity. The arrangement of the sub-divided fat globules and clusters in honeycomb or fibrous structure results in a thick texture. The resulting cream is of high whipping quality and the whip will stay set and will not leak.

In the apparatus above disclosed, the heating or cooling of the cream may be effected by use of heating or cooling fluid in the jacket surrounding the vat and in such event, the coil acts merely as an agitator and neither heating nor cooling fluid is passed therethrough.

I claim:

1. The process of increasing the viscosity of cream which comprises heating a body of the same from the congealing temperature of the butter fat in the cream to approximately the melting temperature of said butter fat, but not appreciably higher and cooling said body of cream to the congealing temperature of the butter fat.

2. The process of increasing the viscosity of cream which comprises heating a body of the same from the congealing temperature of the butter fat therein to approximately the melting temperature of said butter fat, but not appreciably higher, cooling said body of cream to the congealing temperature of the butter fat, and controlling the ultimate degree of viscosity by agitation of the cream during or subsequent to cooling.

3. The process of increasing the viscosity of cream which comprises heating a body of the same from the congealing temperature of the butter fat therein to approximately the melting temperature of said butter fat, but not appreciably higher, holding the cream at said temperature, and subsequently cooling said body of cream to the congealing temperature of said butter fat.

4. The process of increasing the viscosity of cream which comprises heating a body of the same from the congealing temperature of the butter fat therein to approximately the melting temperature of said butter fat, but not appreciably higher, holding the cream at said temperature, subsequently cooling said body of cream to the congealing temperature of said butter fat, and controlling the ultimate degree of viscosity by agitating the cream during or subsequent to cooling.

5. The process of increasing the viscosity of cream which comprises heating a body of the same from a temperature in a range of 40° to 60° F. to a temperature in the range of 75° F. to 95° F. but not appreciably higher and cooling said body of cream to a temperature in the range of 40° F. to 60° F.

6. The process of increasing the viscosity of cream which comprises heating a body of the same from a temperature in the range of 40° to 60° F. to a temperature in the range of 80° F. to 90° F. but not appreciably higher, holding said body of cream at said temperature, and cooling the cream to its original temperature.

7. The process of increasing the viscosity of cream which comprises heating a body of the same from a temperature in the range of 40° to 60° F. to a temperature in the range of 80° F. to 90° F. but not appreciably higher, holding the cream at said temperature, cooling said body of cream to its original temperature, and controlling the ultimate viscosity by agitation during or subsequent to cooling.

8. The process of increasing the viscosity of cream which comprises heating a body of the cream from the congealing temperature of the butter fat therein to approximately the melting temperature of the butter fat, but not appreciably higher, agitating the cream during heating, holding the cream at said temperature, and cooling said body of cream to the congealing temperature of the butter fat.

9. The process of increasing the viscosity of cream which comprises heating a body of the cream from the congealing temperature of the butter fat therein to approximately the melting temperature of the butter fat, but not appreciably higher, agitating the cream during heating, holding the cream at said last temperature, cooling said body of cream to the congealing temperature of the butter fat, and controlling the ultimate viscosity by agitation during or subsequent to cooling.

10. The process of increasing the viscosity of cream which comprises heating a body of the same from approximately 45° F. to approximately 90° F. but not appreciably higher, and cooling said body of cream to approximately 45° F.

11. The process of increasing the viscosity of cream which comprises heating a body of the same from approximately 45° F. to approximately 90° F., but not appreciably higher, cooling said body of cream to approximately 45° F., and controlling the ultimate viscosity by agitation during or subsequent to cooling.

12. The method of increasing the viscosity of cream which comprises heating a body of cream from below the congealing temperature of its butter fat to approximately the melting temperature of said butter fat by passing a stream of hot fluid into indirect heat exchange relation with the cream and varying the position of said stream within said body of cream, holding the cream quiescent at approximately the melting temperature of the butter fat, cooling said cream below the congealing temperature of its butter fat by passing cold fluid into indirect heat exchange relation therewith and varying the position of the stream within the body of cream and subjecting the cream to controlled agitation during cooling to determine its ultimate viscosity.

13. The method of increasing the viscosity of cream which comprises passing heated fluid into indirect heat exchange relation through a body of cream to heat the same from below the congealing temperature of its butter fat to approximately the melting temperature thereof, holding the cream at such temperature, passing cooling fluid in indirect heat exchange relation through the cream to reduce the temperature thereof to approximately its original temperature and subjecting the cream to controlled agitation to determine the ultimate viscosity thereof.

14. The method of treating sweet cream, especially cream having a relatively high fat content, such as used for making whipped cream, for increasing the viscosity of the cream while leaving its other qualities substantially unchanged, consisting in cooling the cream to a sufficiently low temperature and for a sufficiently long time for reducing at least the greatest part of the fat content of the cream to solid form, then heating the cream to at least ordinary room temperature, while avoiding temperatures sufficiently high for again fluidizing the fat solidified through the said cooling, and then again cooling the cream to substantially the same temperature as maintained during the first cooling for a sufficient time for obtaining the desired increase of the viscosity of the cream.

OLIVER W. HUNTER.